United States Patent
Branzell et al.

(10) Patent No.: US 7,161,492 B2
(45) Date of Patent: Jan. 9, 2007

(54) MECHANICAL SELF-CLEANING PROBE VIA A JIGGLER

(75) Inventors: John E. Branzell, Skokie, IL (US); Christopher J. Thomson, Palatine, IL (US)

(73) Assignee: ITT Industries, Chicago, IL (US)

( * ) Notice: Subject to any disclaimer, the term of this patent is extended or adjusted under 35 U.S.C. 154(b) by 49 days.

(21) Appl. No.: 11/004,660

(22) Filed: Dec. 2, 2004

(65) Prior Publication Data

US 2006/0132320 A1   Jun. 22, 2006

(51) Int. Cl.
*G08B 21/00* (2006.01)
(52) U.S. Cl. ............ 340/620; 340/615; 340/618; 73/290 R; 137/558; 137/392
(58) Field of Classification Search ............ 340/612, 340/615, 618, 620; 137/137, 392, 558; 73/290 R, 73/319, 322
See application file for complete search history.

(56) References Cited

U.S. PATENT DOCUMENTS

| | | |
|---|---|---|
| 804,921 A | 11/1905 | Blackburn |
| 1,473,060 A | 11/1923 | Taylor |
| 2,793,538 A | 5/1957 | Sears |
| 2,884,654 A | 5/1959 | Fall |
| 3,056,985 A | 10/1962 | Meyer |
| 3,216,485 A | 11/1965 | Speca |
| 4,577,363 A | 3/1986 | Wyse |
| 4,668,369 A | 5/1987 | King |
| 5,144,700 A * | 9/1992 | Martin .................... 4/415 |
| 6,227,297 B1 | 5/2001 | Milam |
| 6,727,822 B1 * | 4/2004 | Chamberlin et al. ........ 340/620 |
| 2002/0148065 A1 | 10/2002 | Trent |
| 2004/0189478 A1 * | 9/2004 | Chamberlin ................ 340/618 |

* cited by examiner

*Primary Examiner*—Jeffery Hofsass
*Assistant Examiner*—Edny Labbees

(57) ABSTRACT

A device, having a container for holding a fluid moving therein and a conductance probe installed therein for providing a conductance signal indicating whether it is in contact with the fluid, features a jiggler arrangement having a jiggler arranged on the conductance probe so as to form a mechanical self-cleaning conductance probe, which responds to movement of the fluid, for wiping the conductance probe to keep deposits from building up on the conductance probe. The jiggler arrangement may include one or more grooves thereon so that the jiggler can be loosely fitted on the tip between one or more retaining rings arranged in the one or more grooves. The jiggler arrangement may include one or more retaining rings snap-fit on the tip for loosely arranging and retaining the jiggler on the tip.

21 Claims, 8 Drawing Sheets

THE CONDUCTANCE PROBE HAVING A JIGGLER ACCORDING TO THE INVENTION

FIG.1(a)
HOT WATER BOILER
(PRIOR ART)

FIG.1(b)
STEAM OR HOT WATER BOILER
(PRIOR ART)

FIG.1(c)
PROBE CONTROL COUPLED
TO TEE FITTING IN FIGURE 1(a)
(PRIOR ART)

FIG.2(a)
CONDUCTANCE PROBE
(PRIOR ART)

FIG.2(b)
BASE OF
CONDUCTANCE PROBE
(PRIOR ART)

FIG.2(c)
CROSS-SECTION OF CONDUCTANCE
PROBE IN FIGURE 2(a)
(PRIOR ART)

FIG.3(a) THE CONDUCTANCE PROBE HAVING A JIGGLER ACCORDING TO THE INVENTION

FIG.3(b) 1ST ELEVATION VIEW OF THE JIGGLER IN FIGURE 3(a)

FIG.3(c) 2ND ELEVATION VIEW OF THE JIGGLER IN FIGURE 3(a)

FIG.4(a)
EXAMPLE OF ASSEMBLY ROD HAVING
GROOVES FOR ADAPTING JIGGLER

FIG.4(b)
JIGGLER
(FRONT ASSEMBLY VIEW)

FIG.4(c)
JIGGLER
(SIDE ASSEMBLY VIEW)

MECHANICAL SELF-CLEANING PROBE VIA A JIGGLER

BACKGROUND OF THE INVENTION

1. Field of Invention

The present invention relates to an apparatus for cleaning a probe; and more particularly to an apparatus for continuously cleaning a conductance style probe in a steam or hot water boiler during operation in order to control the water level therein.

2. Description of Related Art

Conductance style probes are installed in boilers in order to control the water level in the boiler and to prevent the burner from firing if the water level is too low. When water is below the probe, the probe has low conductance and the probe control unit signals the water feeder or pump to turn on and feed water into the boiler. In addition, the burner is prevented from firing because the water level is too low. If the probe is in water, the conductance is high and the probe control unit signals the water feeder or pump to turn off. In addition, the burner is now allowed to fire, if required. In use, as time passes, a layer of deposits can build up on the tip of the probe. The layer of deposits may eventually affect the conductance characteristics of the probe, and result in false probe readings. The false readings may result in either flooding of the boiler or a dry firing of the boiler. To avoid these problems, it is currently recommended that the probes be cleaned on a routine basis. However, such cleaning is costly because it requires shutdown of the boiler and the downside risk for failure to do so can result in the boiler overheating and/or exploding.

Figures 1A, 1B, 1C:
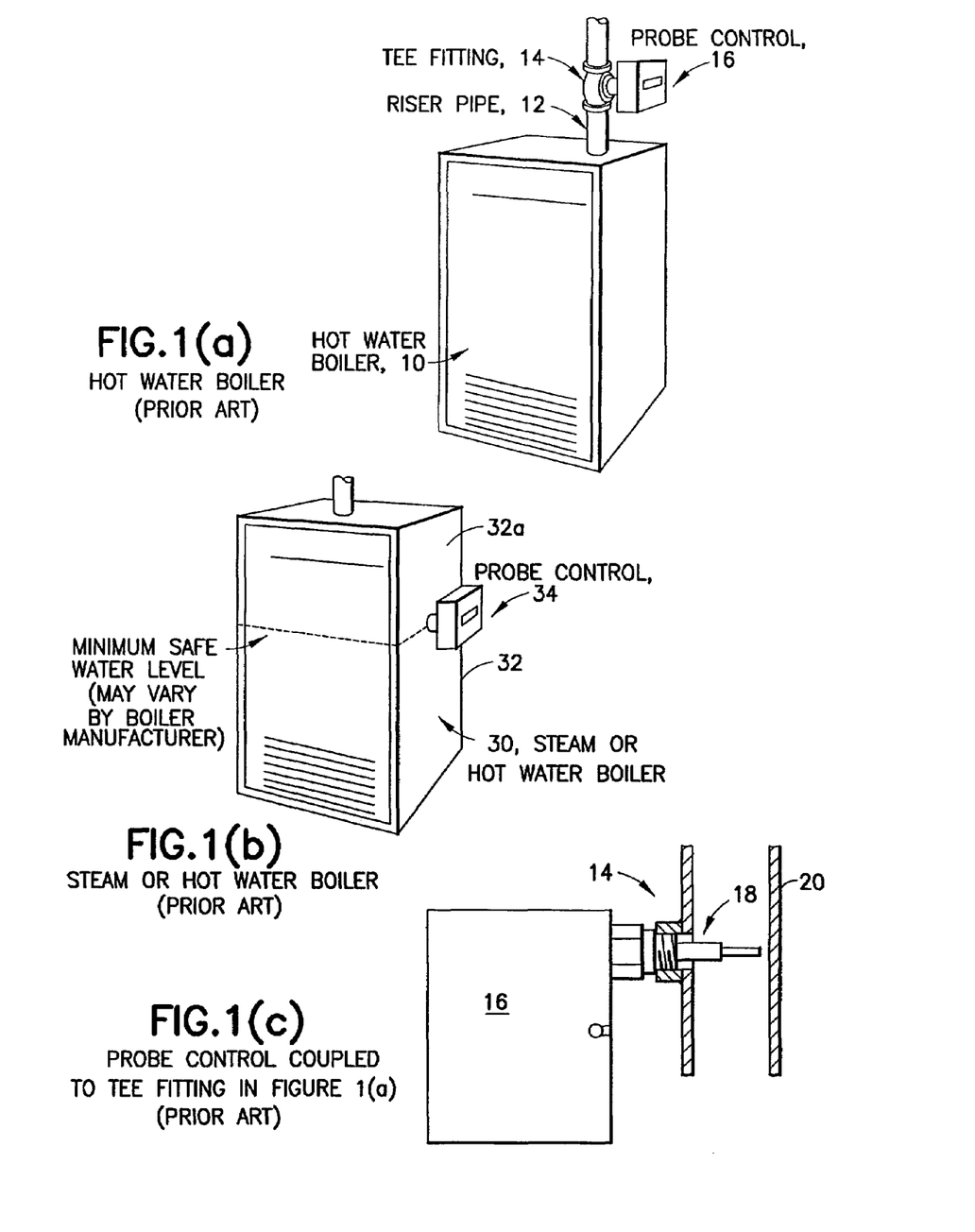
FIG. 1(a) shows a diagram of a known hot water boiler.
FIG. 1(b) shows a diagram of a known steam or hot water boiler.
FIG. 1(c) shows a diagram of a known probe control coupled to a tee fitting shown in FIG. 1(a).

By way of example, FIG. 1(a) shows a hot water boiler generally indicated as 10 that is known in the art including a riser pipe 12 having a tee fitting 14 arranged thereon with a probe control 16 arranged thereon. The probe control 16 has the conductance probe generally indicated as 18 arranged therein and inside the walls 20 of the tee fitting 14, as shown in FIG. 1(c). In operation, the probe control 16 provides an electrical signal to the fluid and senses the conductance signal from the conductance probe 18. In this embodiment, the conductance probe 18 monitors the water flowing through the riser pipe 12.

In comparison, FIG. 1(b) shows a steam or hot water boiler 30 having a container 32 with a probe control 34 arranged on a side wall 32a thereof. The probe control 34 has the conductance probe (not shown) arranged therein and inside the side wall 32a, similar to conductance probe 18 in FIG. 1(c). In this embodiment, the conductance probe (not shown) monitors the water level in the container 32 to make sure a minimum safe water level is maintained therein.

Figure 2A:
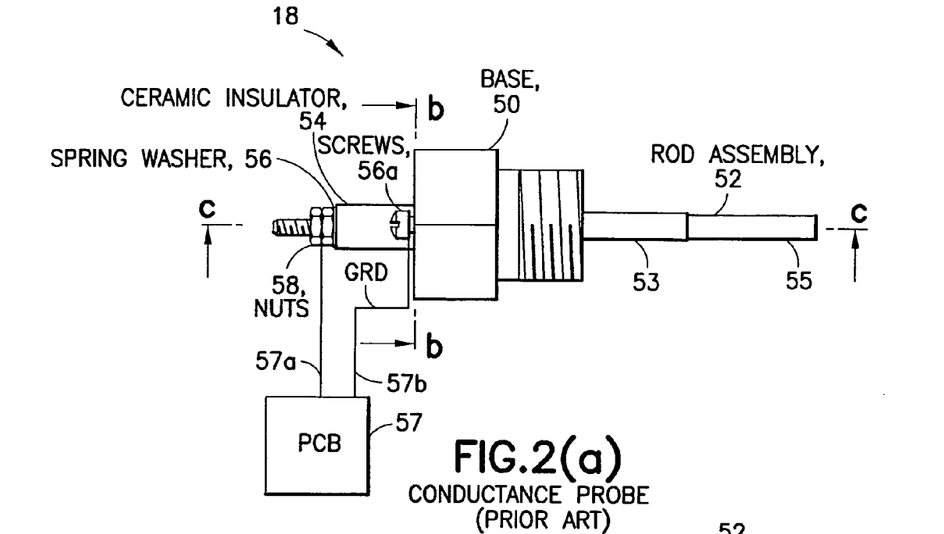
FIG. 2(a) shows a partial assembly drawing of a known conductance probe shown in FIG. 1(c).
Figure 2B:
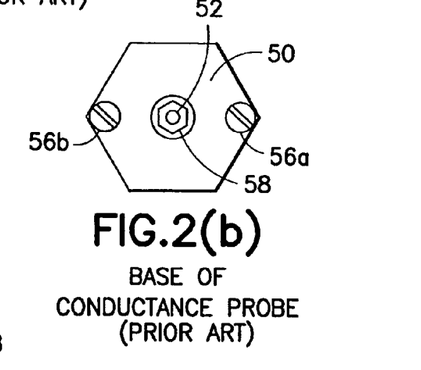
FIG. 2(b) shows a partial assembly drawing of a side view along lines b—b of the conductance probe shown in FIG. 2(a).
Figure 2C:
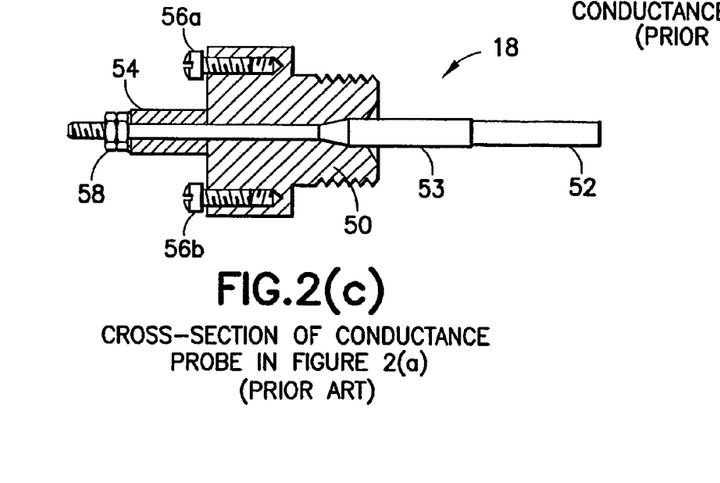
FIG. 2(c) shows a partial assembly drawing of a cross-section along lines c—c of the conductance probe shown in FIG. 2(a).

FIGS. 2(a), 2(b) and 2(c) show the conductance probe 18 in FIG. 1(c) in greater detail, which includes a base 50, an assembly rod 52, a ceramic insulator 54, a spring washer 56, screws 56a, 56b and nuts 58. The assembly rod 52 is a conducting element partially wrapped with Teflon 53 for providing an electric insulator between the base 50 and the rod assembly 52, leaving a conducting tip 55 as shown. The operation of the conductance probe 18 in relation to the device 10 or 30 (FIGS. 1(a) and (b) and the probe control 16 is known in the art. By way of example, when installed in a boiler or other suitable device, a wire 57a from a printed circuit board 57 in the probe control 16 (FIG. 1(a) or (b)) is coupled between the nuts 58 and the base 50, and a pair of wires such as 57b are coupled from the screws 56a, 56b to ground. When the probe comes into contact with the fluid, a conductance signal is provided to the PCB 57 via the wire 47a. The conductance probe may also take the form of a capacitive-based probe which is known in the art having a layer of Teflon or other suitable insulator or dielectric material covering the whole tip.

Some other patents known in the art having electrodes and/or probes and devices for cleaning the same to detect parameters include U.S. Pat. Nos. 1,473,060 and 4,668,369, which show electrode cleaners having devices for moving a cleaning device to clean an electrode. For example, in the '060 patent, the electrode cleaning device is a rotating brush powered by a motor. In the '369 patent, the electrode cleaning device is a reciprocating wiper structure powered by an air operated cylinder. Other known patents show various means for cleaning shafts, not electrodes, including U.S. Pat. No. 3,216,485 having a loosely fitting collar member arranged on a rod, which forms part of a heat exchanger, to keep deposits from forming on the rod.

In view of the aforementioned, there is a need in the art for a mechanical self-cleaning conductance probe, especially for use in steam or hot water boilers and other devices for heating fluids.

SUMMARY OF INVENTION

In its broadest sense, the present invention provides a new and unique device having a container for holding a fluid moving therein and a conductance probe installed therein for providing a conductance signal indicating whether it is in contact with the fluid. The device features a jiggler arrangement having a jiggler loosely arranged and retained on a tip of the conductance probe so as to form a mechanical self-cleaning conductance probe, which responds to movement of the fluid, for wiping the surface of the tip to keep deposits from building up on the same. In operation, the jiggler continuously cleans the surface of the element during the operation of the device.

In one embodiment, the jiggler arrangement may include the tip having one or more grooves therein and one or more retaining rings arranged in the one or more grooves so that the jiggler is loosely arranged and retained on the tip. This embodiment includes the jiggler being loosely arranged and retained between two retaining rings respectively arranged in two grooves.

In an alternative embodiment, the jiggler arrangement may include the tip having one or more push-on retaining rings that are snap-fit on the tip so that the jiggler is loosely arranged and retained on the tip. This embodiment includes the jiggler being loosely arranged and retained between two retaining rings snap-fit on the tip. In this alternative embodiment, no groove or grooves are need on the tip.

The tip of the conductance probe may take the form of either a bare metal tip so as to form a conducting element, or a metal tip wrapped entirely in Teflon or other suitable insulator and/or dielectric material so as to form a capacitive element when in contact with the fluid.

The conductance probe includes a base having an assembly rod arranged therein and having Teflon or other suitable insulating material arranged between the assembly rod and the base. The assembly rod has the tip at one end thereof.

The jiggler may be made from many different types or kinds of material having various specific gravities in relation to the fluid being sensed. According to the invention, the jiggler is made from a material having a specific gravity that allows motion of the fluid to create movement of the jiggler. For example, in one embodiment the jiggler may be made from a material having a specific gravity substantially similar to the specific gravity of the fluid. Alternatively, the jiggler may be made from a material having a specific gravity that is different from the specific gravity of the fluid, or roughly similar to the fluid. In particular, when used in a boiler that boils water, the jiggler may be made from a material that preferably has a specific gravity substantially equal to about 1.0. Moreover, the jiggler may be made from a material that does not melt up to a predetermined temperature, including 250 degree Fahrenheit when used in a 15 lb/in$^2$ boiler. By way of example, the jiggler may be made from a non-electrically conductive material such as Noryl 731, as well as a conductive material such as ceramic.

The jiggler may take the form of many different shapes to enhance its responsiveness to the movement of the fluid. For example, the jiggler may include one or more radially and/or axially protruding structures to enhance its responsiveness to the movement of the fluid, including curved or straight radially extending fins.

The jiggler may be used in device such as a steam or hot water boiler having a heating element for boiling water contained therein. For example, in one particular embodiment the device may be a hot water boiler including a riser pipe having a tee fitting with a probe control arranged therein, wherein the probe control has the conductance probe having a jiggler arrangement inside the tee fitting so that the jiggler responds to movement of the fluid in the riser pipe. In another particular embodiment, the device may be a steam or hot water boiler having a container with a probe control arranged on a side wall thereof, wherein the probe control has the conductance probe having a jiggler arrangement arranged therein and inside the side wall so that the jiggler responds to movement of the fluid in the container. In either case, the device also would include a probe control, similar to that discussed above, for providing an electrical signal to the fluid and sensing the conductance signal from the conductance probe.

In summary, the jiggler is uniquely designed to fit loosely on the tip of the conductance probe. The one or more retaining rings may be snap-fit onto the tip for loosely holding the jiggler on the tip, or the one or more retaining rings may be arranged in one or more grooves formed in the tip of the conductance probe for loosely holding the jiggler on the tip. The jiggler may be made from any non-electrically-conducting material, with a specific gravity near about 1.0, that can withstand the steam/hot water environment inside of a typical boiler. Since the jiggler fits loosely on the tip of the probe, and because its density is near the density of water, any motion of the water should induce movement of the jiggler. In operation, as the water level in the typical boiler rises and falls, and also as the surface of the water roils when the water is boiling, the jiggler will move around or jiggle on the tip of the probe. The jiggling action will create a wiping action between the inner surfaces of the jiggler and the tip of the probe. The wiping action will keep deposits from building up on the tip of the conductance probe.

One advantage of the present is that by adding the jiggler on the tip of the conductance probe it may be possible to either eliminate or greatly reduce the need for routine and expensive cleaning of the surface of the tip of the conductance probe.

BRIEF DESCRIPTION OF THE DRAWING

The drawing, not drawn to scale, includes the following Figures:

FIG. 3(a) shows a photograph of a conductance probe having a jiggler thereon according to the present invention.

FIGS. 3(b) and (c) show photographs of elevational views of the jiggler shown in FIG. 3(a) according to the present invention.

DETAILED DESCRIPTION OF INVENTION

Figures 3A, 3B, 3C:
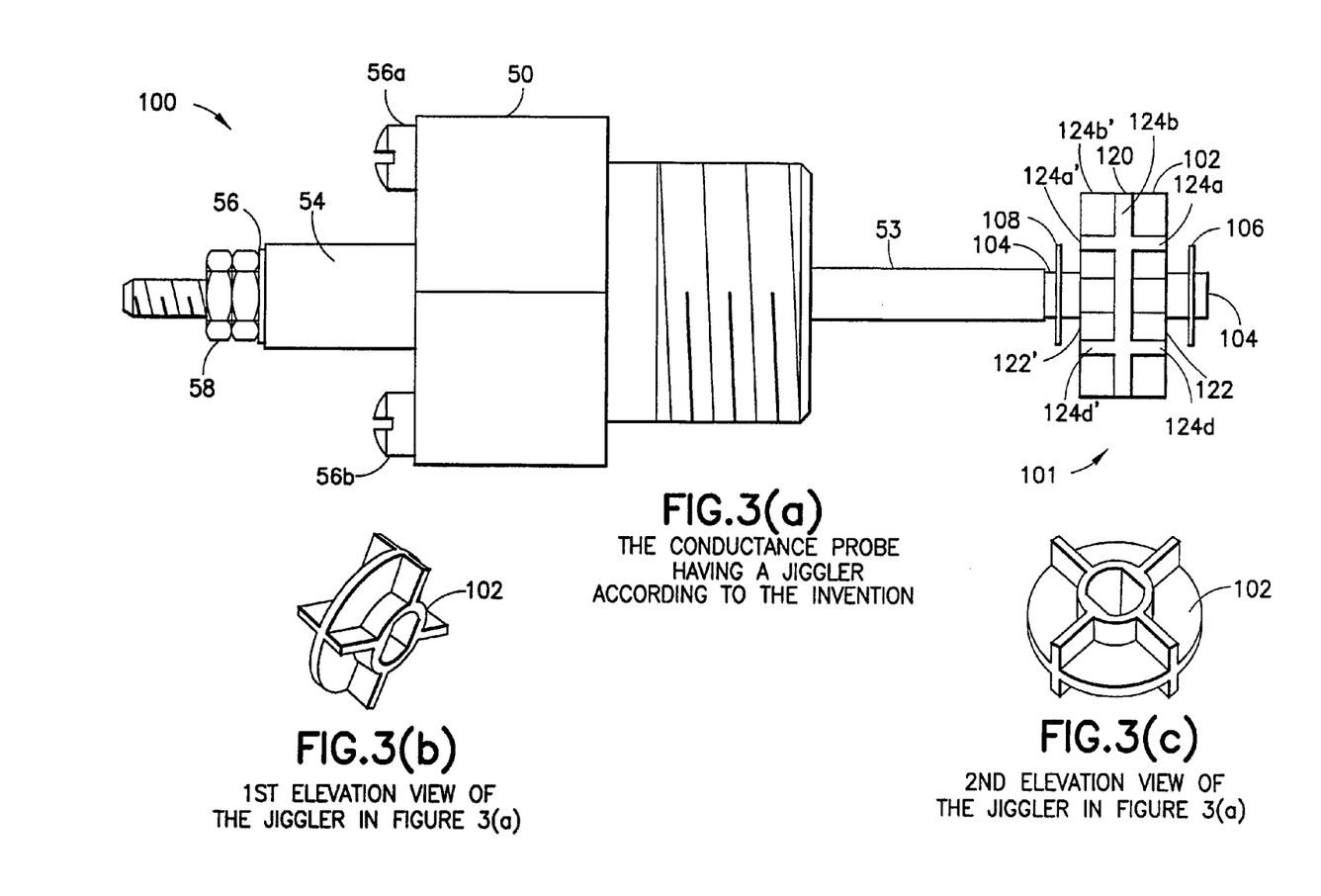

FIG. 3(a) shows, by way of example, a conductance probe generally indicated as 100 featuring a jiggler arrangement 101 having a jiggler 102 arranged thereon so as to form a mechanical self-cleaning conductance probe according to the present invention. In operation, the jiggler 102 responds to movement of the fluid in a container, such as container element 32 shown in FIG. 1(b), for wiping a surface of a tip 104 of the conductance probe 100 to keep deposits from building up on the same. As shown, the jiggler arrangement 101 includes the jiggler 102 being loosely arranged and retained on the tip 104 by one or more retaining clips 106, 108 arranged thereon so that the jiggler 102 may respond to movement of the fluid, for wiping a surface of the tip 104 to keep deposits from building up on the same.

Figure 4A:
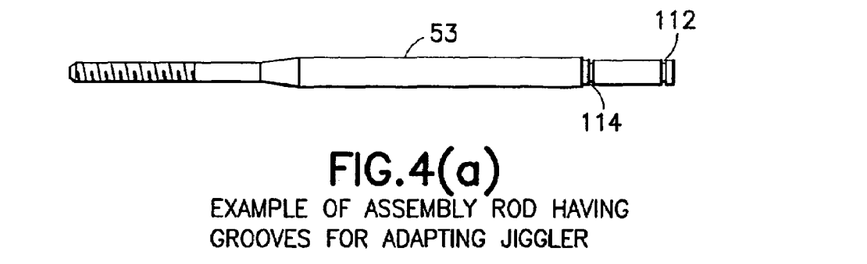
FIG. 4(a) shows a partial assembly drawing of the assembly rod having grooves therein according to the present invention.

FIG. 4(a) shows the tip 104 in the form of an assembly rod having an end generally indicated as 110 with one or more grooves 112, 114 formed therein so that the jiggler 102 (FIG. 3(a)) can be loosely arranged and retained on the end 110 by the one or more retaining rings 106, 108 (FIG. 3(a)) arranged in the one or more grooves 112, 114. This embodiment includes the jiggler 102 being loosely arranged and retained between the two retaining rings 106, 108 on the tip 104.

However, the scope of the invention is not intended to be limited to any particular type, kind or number of groove(s) formed in the tip 104, the depth of the grooves formed therein, the width of the grooves formed therein, or the manner or technique in which the grooves are formed therein, including machining or crimping the grooves. As shown, the one or more grooves 112, 114 are circumferential about the tip, although embodiments are envisioned using partially circumferential grooves or other suitable grooves known or later developed in the future. The scope of the invention is intended to include the jiggler 102 being loosely arranged and retained on the tip 104 by one retaining clip such as 106 or 108, which is either snap fit onto the tip or arranged in one of the grooves 112 or 114 so that the jiggler may respond to movement of the fluid, for wiping a surface of the tip 104 to keep deposits from building up on the same. Moreover, the jiggler arrangement 101 may include the tip 104 having one or more push-on retaining rings like 106, 108 that are snap-fit on the tip 104 so that the jiggler 102 is loosely arranged and retained on the tip. In this alternative embodiment, no groove or grooves 112, 114 are need on the end 110 of the tip 104.

Figure 4B:
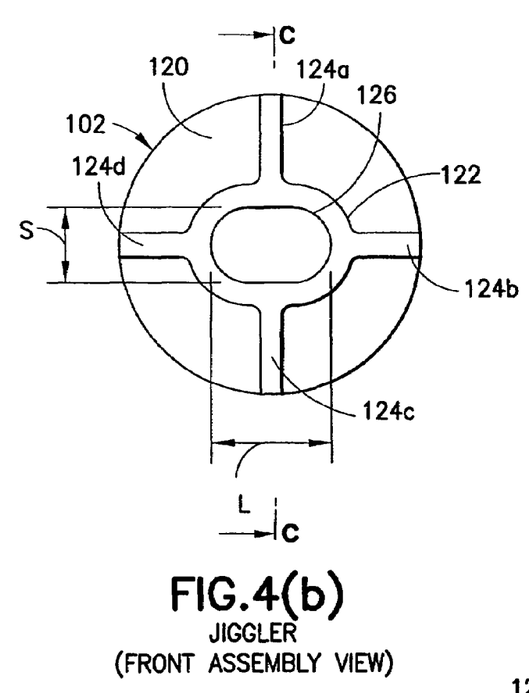
FIG. 4(b) shows a partial assembly drawing of the jiggler shown in FIG. 3(a).
Figure 4C:
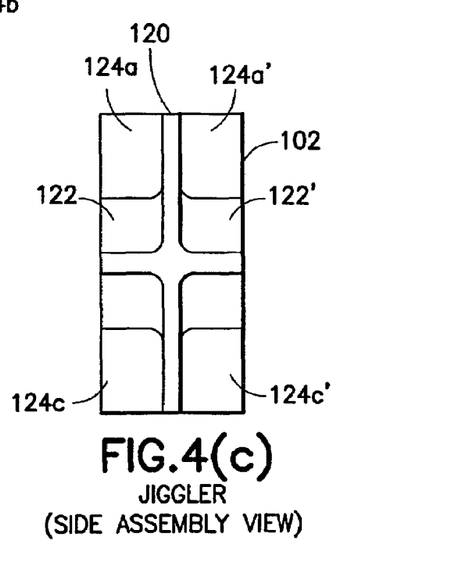
FIG. 4(c) shows a partial assembly drawing of a side view of the jiggler shown in FIG. 4(b) along section lines c—c.

FIGS. 4(b) and (c) show the jiggler 102 as a molded piece formed as a ring or disk 120 having raised cylindrical walls 122, 122' on each side thereof and having radially protruding fins or walls 124a, 124a', 124b, 124b', 124c, 124c', 124d, 124d', which together combine to provide a structure that effectively coacts with the fluid so as to induce as much movement of the jiggler as possible in response to fluid flow. The jiggler 102 also has an opening 126 for receiving the assembly rod 104 in a loosely fitting manner. As shown, the opening 126 is substantially oblong or oval in shape having a longer length L and a shorter width S, although the scope of the invention is not intended to be limited to any particular shape or size of the opening.

The Jiggler Material

The jiggler 102, as well as all the jigglers shown and described herein, may be made from many different types or kinds of materials having various specific gravities. According to the present invention, the jiggler is made from a material having a specific gravity that allows motion of the fluid to create movement of the jiggler. For example, the jiggler may be made from a material having a specific gravity substantially similar to the specific gravity of the fluid. When used in a boiler that boils water, the material preferably has a specific gravity substantially equal to about 1.0. In addition, the jiggler may be made from a material that does not melt up to a predetermined temperature, including 250 degree Fahrenheit when used in a 15 lb/in$^2$ boiler, as well as 406 degree Fahrenheit when used in a 250 lb/in$^2$ boiler, including materials that are either now known or later developed in the future. The scope of the invention is not intended to be limited to any particular type or kind of material, materials having any particular specific gravity, or any particular relationship between the specific gravity of the material and the specific gravity of the fluid. For example, the jiggler may be made from a non-electrically conductive material, including Noryl 731, as well as a conductive material such as ceramic. (In embodiments, using the electrically conductive material, the determination of the level of the water would have to be offset by the dimension of the jiggler being used.) The scope of the invention is intended to include using material for the jiggler 104 both now known and later developed in the future in accordance with the spirit of the invention.

The Jiggler Shape

The jiggler 104 may take the form of many different shapes to enhance its responsiveness to the movement of the fluid. For example, jiggler 104 may include one or more radially protruding or other suitable structures to enhance the responsiveness of the jiggler to the movement of the fluid, consistent with that described herein.

The scope of the invention is not intended to be limited to any particular type or kind of jiggler, which includes but is not limited to the dimensions of the jiggler, or the shape of the jiggler, or the manner or technique in which the jiggler is made, manufactured or produced, including making the jiggler by injection molding. Moreover, embodiments are envisioned using a jiggler formed as one integral piece, as well as jigglers formed in two or more pieces that are suitably coupled or fastened together. FIGS. 5(a) through 9(c) show, by way of example, a multiplicity of jiggler designs envisioned by the inventors.

Figure 5A:
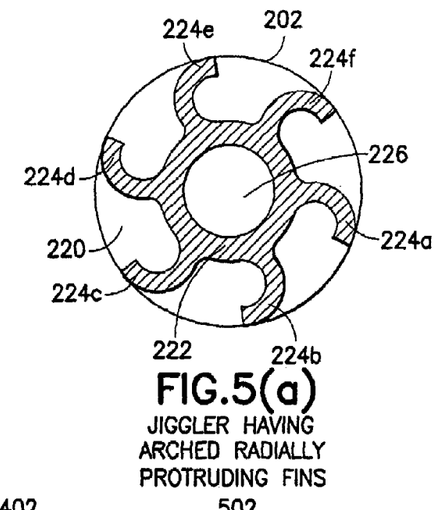
FIG. 5(a) shows a diagram of an alternative embodiment of the jiggler according to the present invention.

For example, FIG. 5(a) shows an alternative jiggler 202 featuring a ring or disk 220 having a raised cylindrical wall 222 and raised arched radially protruding fins 224a, 224b, 224c, 224d, 224e, 224f all formed on each side of ring or disk 220, as well as an opening 226 for receiving the tip 104 in FIG. 3(a).

Figure 5B:
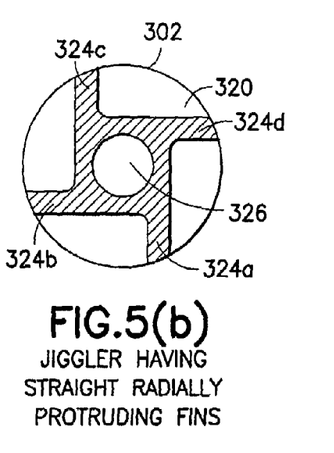
FIG. 5(b) shows a diagram of an alternative embodiment of the jiggler according to the present invention.
Figure 6A:
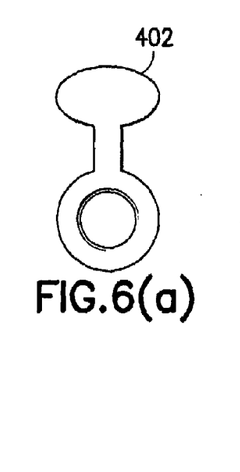
FIGS. 6(a) to (f) show diagrams of alternative embodiments of the jiggler having different geometric shapes according to the present invention.
Figures 6B, 6C:
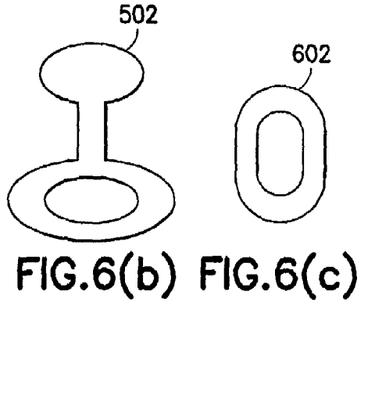
Figure 6D:
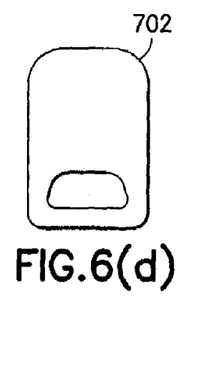
Figure 6E:
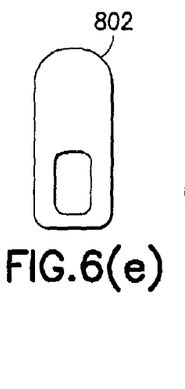
Figure 6F:
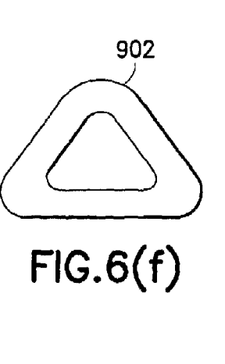

FIG. 5(b) shows still another alternative jiggler 302 featuring a ring or disk 320 having a raised cylindrical wall 322 and raised arched radially protruding fins 324a, 324b, 324c, 324d formed on each side thereof, as well as an opening 326 for receiving the tip 104 in FIG. 3(a).

The scope of the invention is intended to include jigglers having many different shapes and sizes including the jigglers that shown, by way of further example, in FIGS. 6(a) to (f) featuring jigglers 402, 502, 602, 702, 802, 902.

It is important to note that the scope of the invention is not intended to be limited to the manner in which the jiggler is loosely fitted in the tip 110. For example, FIGS. 7(a), (b) and (c) show a jiggler 1002 that may be snap fit on the tip 1052. In this case, the jiggler 1002 has two legs 1002a, 1002a' with inwardly extending fins 1002, 1002b' for cooperating with grooves 1012 formed in the tip 1052. The legs 1002a, 1002a' also have guide members 1002c, 1002c' for guiding the jiggler 1002 in relation to the tip 1052.

Figure 8A:
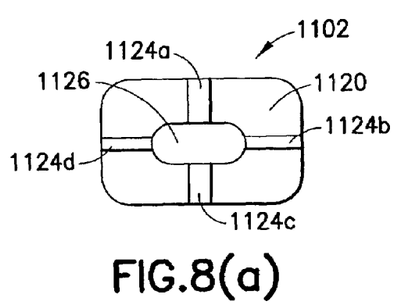
FIGS. 8(a) and (b) show diagrams of an alternative embodiment of the jiggler according to the present invention, with FIG. 8(b) being a left-to-right side view of the jiggler shown in FIG. 8(a).
Figure 8B:
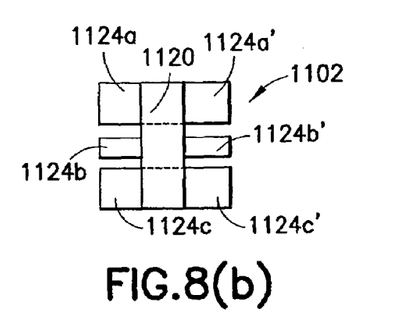
Figure 8C:
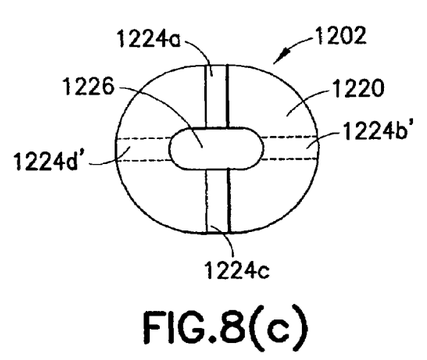
FIGS. 8(c) and (d) show diagrams of an alternative embodiment of the jiggler according to the present invention, with FIG. 8(d) being a left-to-right side view of the jiggler shown in FIG. 8(c).
Figure 8D:
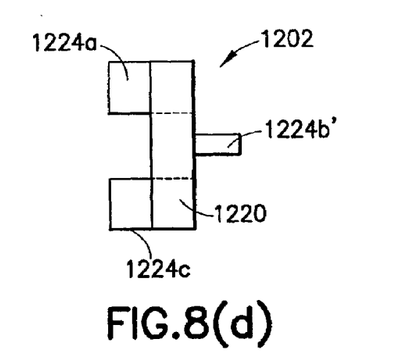
Figure 8E:
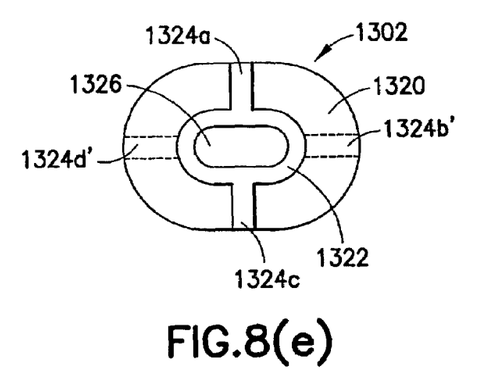
FIGS. 8(e) and (f) show diagrams of an alternative embodiment of the jiggler according to the present invention, with FIG. 8(f) being a left-to-right side view of the jiggler shown in FIG. 8(e).
Figure 8F:
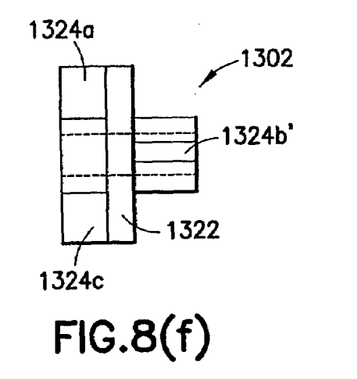

FIGS. 8(a) to (f) show three other jiggler designs, including a jiggler 1102 in FIGS. 8(a) and 8(b), a jiggler 1202 in FIGS. 8(c) and 8(d) and a jiggler 1302 in FIGS. 8(e) and (f). These three jigglers have similar designs in that each has a disk-like element 1120, 1220 and 1320 having raised radially protruding fins like 1224a, 1224b, 1224c, 1224d and an opening 1126, 1226, 1326. The jigglers 1202 and 1302 in FIGS. 8(c) to 8(f) have alternating fins on opposing sides of the rings 1120, 1220. The jiggler 1320 also has a raised wall 1322.

Figure 7A:
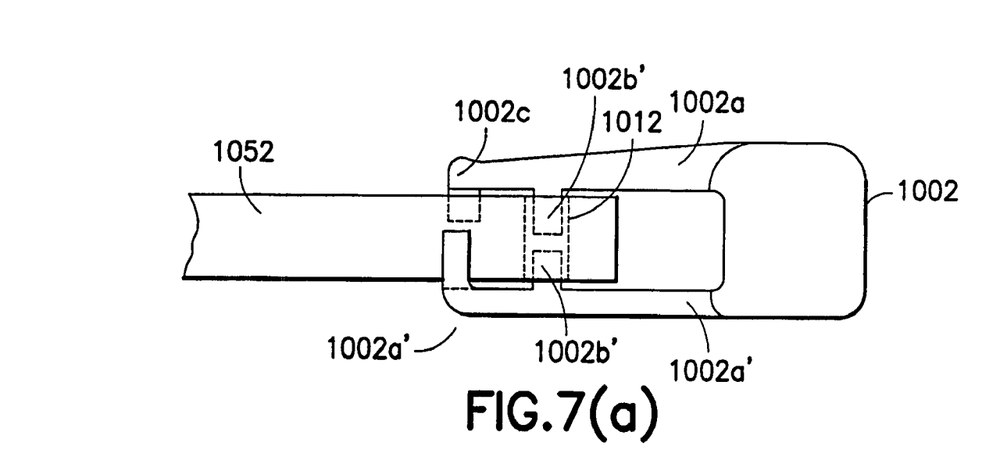
FIGS. 7(a) to (c) show diagrams of an alternative embodiment of the jiggler according to the present invention.
Figure 7B:
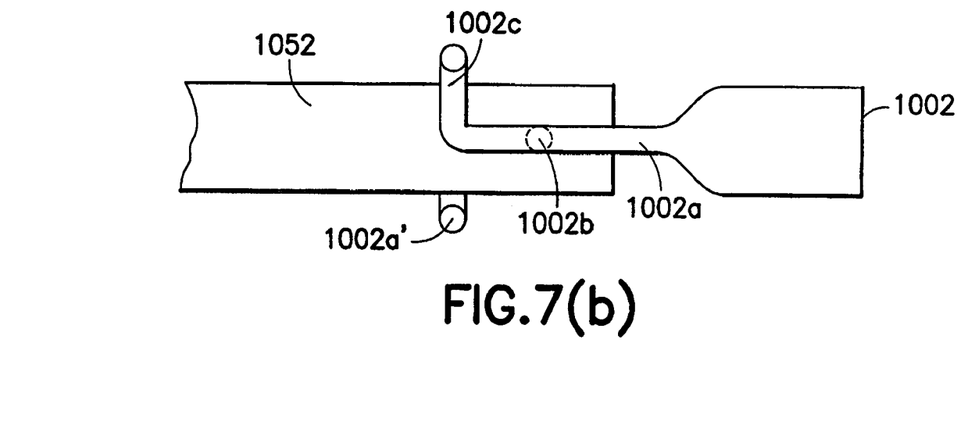
Figure 7C:
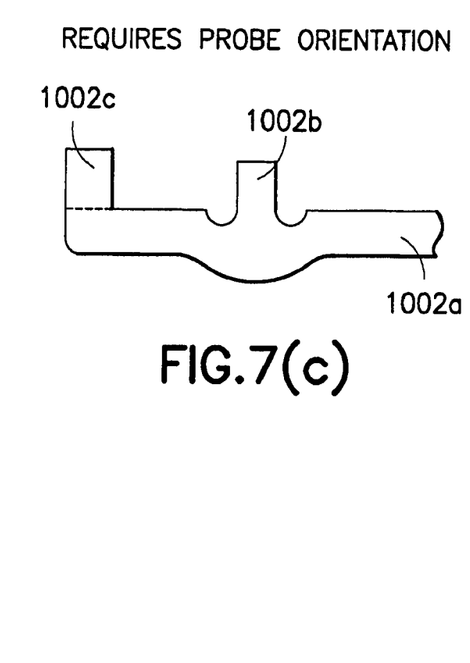
Figure 9A:
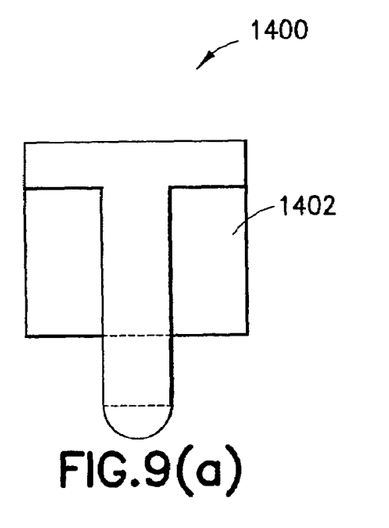
FIGS. 9(a) to (c) show diagrams of an alternative embodiment of the jiggler according to the present invention, with Figure (a) being a side view of FIG. 9(b) and with Figure (c) being a bottom view of FIG. 9(b).
Figure 9B:
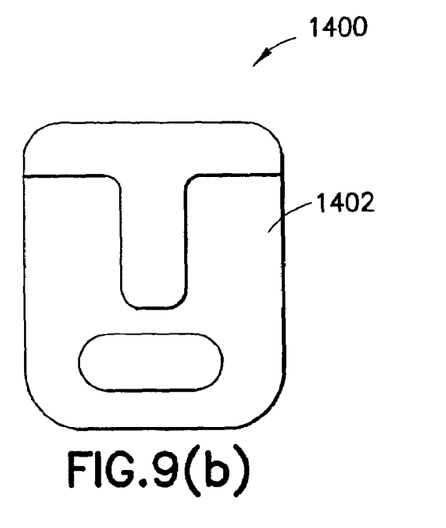
Figure 9C:
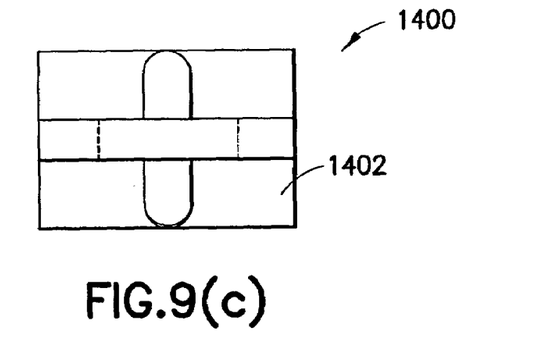

FIGS. 9(a) to 9(c) show a non-concentric jiggler design 1400 having off-set buoyancy lobes that share features similar to the jiggler designs shown in FIGS. 7(a) to (c). In these designs the jiggler 1400 has a respective heavy lobe 1402 on one side. This designed tends to work better in non-flow induced embodiments.

The Jiggler Orientation

Figure 10:
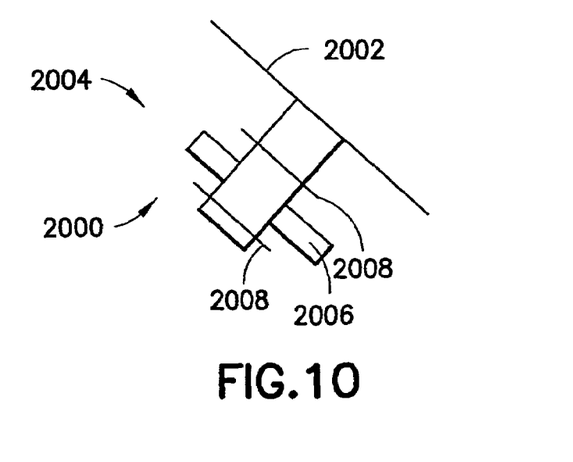
FIG. 10 shows a conductance probe arranged obliquely in relation to a wall of a container of a device.

In the devices shown and described herein, the jiggler is typically horizontally arranged in the tee fitting 14 in the riser pipe 12 shown in FIGS. 1(a) and (b) or in the boiler 30 shown in FIG. 1(c). However, the scope of the invention is not intended to be limited to any particular orientation of the jiggler in the device, and may include arrangements having a vertical orientation or sloped orientation. FIG. 10 shows a conductance probe 2000 arranged obliquely in relation to a wall 2002 of a container of a device. The conductance probe 2000 has a jiggler arrangement 2004 having a jiggler 2006 arranged between two retaining rings 2008.

Other Retaining-Type Structures

Moreover, embodiments are also envisioned in which fastening devices other than a retaining ring and groove combination are used, including using an assembly rod having a pair of integrally formed protruding rings in combination with a jiggler having a radial opening for snapping onto the tip between the integral ring formations, or alternatively with a two piece jiggler that may be fit onto the tip and fastened together thereon.

Scope of the Invention

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

What is claimed is:

1. A device having a container for holding a fluid moving therein and with a conductance probe installed therein for providing a conductance signal indicating whether it is in contact with the fluid, characterized in that
    the device comprises a jiggler arrangement having a jiggler loosely arranged and retained on a tip of the conductance probe responsive to movement of the fluid, for wiping a surface of the conducting element to keep deposits from building up on the same.

2. A device according to claim 1, wherein the jiggler arrangement includes the tip having one or more grooves therein and one or more retaining rings arranged in the one or more grooves so that the jiggler is loosely arranged and retained on the tip.

3. A device according to claim 2, wherein the jiggler is loosely arranged and retained between two retaining rings respectively arranged in two grooves.

4. A device according to claim 1, wherein the jiggler arrangement includes the tip having one or more push-on retaining rings that are snap-fit on the tip so that the jiggler is loosely arranged and retained on the tip.

5. A device according to claim 4, wherein the jiggler is loosely arranged and retained between two retaining rings snap-fit on the tip.

6. A device according to claim 1, wherein the tip is a bare metal tip so as to form a conducting element.

7. A device according to claim 1, wherein the tip is a metal tip wrapped entirely in Teflon or other suitable dielectric so as to form a capacitive element when in contact with the fluid.

8. A device according to claim 1, wherein the jiggler includes one or more radially or axial protruding structures to enhance the responsiveness to the movement of the fluid.

9. A device according to claim 1, wherein the device comprises a probe control for providing an electrical signal to the fluid and sensing the conductance signal from the conductance probe.

10. A device according to claim 1, wherein the device is a hot water boiler including a riser pipe having a tee fitting arranged thereon with a probe control arranged thereon, the probe control having the conductance probe arranged therein and inside the tee fitting that responds to movement of the fluid in the riser pipe.

11. A device according to claim 1, wherein the device is a steam or hot water boiler having a container with a probe control arranged on a side wall thereof; and the probe control having the conductance probe arranged therein and inside the side wall that responds to movement of the fluid in the container.

12. A device according to claim 1, wherein the jiggler has one or more protruding walls, fins or some combination thereof, for enhancing the responsiveness of the jiggler to fluid movement in the container.

13. A device according to claim 12, wherein the one or more protruding walls, fins or some combination thereof, include a circumferential wall having radially extending fins on either or both sides of the jiggler.

14. A device according to claim 13, wherein the radially extending fins are either arched or straight.

15. A device according to claim 1, wherein the jiggler has a disk-like or ring-like shape having an opening for receiving the conducting element of the conductance probe.

16. A device according to claim 1, wherein the jiggler is snap-fit onto the conducting element of the conductance probe and loosely arranged thereon.

17. A device according to claim 1, wherein the device is a boiler having a heating element for boiling water contained therein.

18. A device according to claim 1, wherein the jiggler is made from a material having a specific gravity that allows motion of the fluid to create movement of the jiggler.

19. A device according to claim 18, wherein the jiggler is made from a material having a specific gravity that is substantially similar to the specific gravity of the fluid.

20. A device according to claim 1, wherein the jiggler is made from a material that does not melt up to a predetermined temperature.

21. A device according to claim 1, wherein the jiggler is made from either an electrically conductive material or a non-electrically conductive material.

* * * * *